(12) United States Patent
Majumder et al.

(10) Patent No.: US 11,811,219 B2
(45) Date of Patent: Nov. 7, 2023

(54) RESTORATION OF FAULT INSULATED FEEDER

(71) Applicant: ABB Schweiz AG, Baden (CH)

(72) Inventors: Ritwik Majumder, Västerås (SE); Bertil Berggren, Västerås (SE); David Schaeffer, Västerås (SE); Lidong Zhang, Västerås (SE); Frans Dijkhuizen, Skultuna (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/753,155

(22) PCT Filed: Aug. 28, 2019

(86) PCT No.: PCT/EP2019/072986
§ 371 (c)(1),
(2) Date: Feb. 22, 2022

(87) PCT Pub. No.: WO2021/037357
PCT Pub. Date: Mar. 4, 2021

(65) Prior Publication Data
US 2022/0337051 A1 Oct. 20, 2022

(51) Int. Cl.
H02J 3/36 (2006.01)
H02H 7/26 (2006.01)
H02J 3/00 (2006.01)

(52) U.S. Cl.
CPC ........... *H02H 7/268* (2013.01); *H02J 3/0073* (2020.01); *H02J 3/36* (2013.01)

(58) Field of Classification Search
CPC ......... H02J 3/0073; H02H 7/268; H02M 3/36
See application file for complete search history.

(56) References Cited

U.S. PATENT DOCUMENTS

2008/0225452 A1 9/2008 Stoupis et al.
2008/0288118 A1 11/2008 Solo et al.
(Continued)

FOREIGN PATENT DOCUMENTS

CN 108767853 A 11/2018
CN 109768546 A 5/2019
(Continued)

OTHER PUBLICATIONS

Teng, Jen-Hao, et al.; "Feeder-Switch Relocation for Customer Interruption Cost Minimization"; 2002 IEEE Transactions on Power Delivery; vol. 17, Issue 1; Aug. 7, 2002; Pages.
(Continued)

*Primary Examiner* — Harry R Behm
(74) *Attorney, Agent, or Firm* — WHITMYER IP GROUP LLC

(57) ABSTRACT

A method for restoration of a fault isolation in a medium voltage, MV, network having a plurality of feeders and a plurality of normally open, NO, switches possibly in parallel with MV direct current, DC, links is presented. The method is performed in a control device of the MV network. The method includes closing at least two NO switches in parallel with MVDC links of the plurality of NO switches, being connected to a fault isolated feeder of the plurality of feeders of the MV network, and opening the closed at least two NO switches in parallel with MVDC links except one. A control
(Continued)

device, a computer program and a computer program product for restoration of a fault isolation in a MV network are also presented.

13 Claims, 7 Drawing Sheets

(56) References Cited

U.S. PATENT DOCUMENTS

| | | | | |
|---|---|---|---|---|
| 2009/0112375 | A1* | 4/2009 | Popescu | G06Q 50/06 700/286 |
| 2018/0316188 | A1* | 11/2018 | Ishchenko | H02H 7/262 |
| 2020/0295557 | A1* | 9/2020 | Cox | H02J 3/0073 |

FOREIGN PATENT DOCUMENTS

| | | | |
|---|---|---|---|
| EP | 2056424 | A2 | 5/2009 |
| EP | 3203601 | A1 * | 8/2017 |
| WO | 2009076410 | A1 | 6/2009 |
| WO | 2015027484 | A1 | 3/2015 |

OTHER PUBLICATIONS

Kalinowski, Eduardo M., et al.; "The Problem of Restoration of Distribution Networks: a Heuristic Method"; IJCSNS International Journal of Computer Science and Network Security; vol. 7, No. 3; Mar. 5, 2007; 8 Pages.

Zidan, Aboelsood; et al.; "Service Restoration in Balanced and Unbalanced Distribution Systems with High DG Penetration"; 2011 IEEE Power and Energy Society General Meeting; Detroit, MI, USA; Jul. 24, 2011.

Stojkov, Marinko, et al.; Optimization of Switching Conditions in Distribution Power Subsystem; Technical Gazette, vol. 22; Oct. 1, 2015; 7 Pages.

Ghaweta, Ahmad, et al.; "Optimal Distribution Feeder Reconfiguration with Distributed Generation using Intelligent Techniques"; 2018 IEEE International Conference on Electro/Information Technology (EIT); May 1, 2018; 125 Pages.

Shekhar, Aditya, et al.; "Reconfigurable DC Links for Restructuring Existing Medium Voltage AC Distribution Grids"; Electric Power Components and Systems; Taylor & Francis Group, LLC; Jan. 16, 2018; 9 Pages.

Sulaima, M. F.; et al; "Distribution Network Reconfiguration Via Service Restoration by Using IABC Algorithm Considering Distributed Generation"; ARPN Journal of Engineering and Applied Sciences; vol. 13, No. 11; Jun. 1, 2018; 8 Pages.

Bloemink, Jeffrey M.; et al.; "Increasing Distributed Generation Penetration using Soft Normally-Open Points"; IEEE PES General Meeting; Minneapolis, MN, USA; Jul. 25, 2019; 8 Pages.

Bottrell, Nathaniel, et al; "Active Response To Distribution Network Constraints"; 25th International Conference on Electricity Distribution; CIRED Repository 2019 Conference; Madrid, Spain; Paper No. 2080; Jun. 3, 2019; 6 Pages.

International Search Report and Written Opinion of the International Searching Authority; Application No. PCT/EP2019/072986; Completed: May 13, 2020; dated May 26, 2020; 16 Pages.

"Distribution System Restoration and Reconfiguration"; N/A.

International Preliminary Report on Patentability; Application No. PCT/EP2019/072986; Completed: Mar. 1, 2022; 8 Pages.

* cited by examiner

RESTORATION OF FAULT INSULATED FEEDER

TECHNICAL FIELD

The present disclosure relates to a method, a control device, a computer program, and a computer program product for restoration of an isolated line after fault clearance in a medium voltage network.

BACKGROUND

In distribution networks, use of medium voltage (MV) direct current (DC) links in parallel with normally open (NO) switches is used to enhance power capacity, to reduce system loss with flexible grid operation and for voltage support. The main advantage of a MVDC link is to enable power exchange between feeders without closing the parallel NO switch. A radial structure of the distribution feeders can in this way be maintained. However, when a feeder of a MV network is disconnected from a substation during a fault isolation/clearance, the restoration process involves closing a NO switch to establish a synchronous connection with a healthy feeder of the MV network. Other MVDC links can be used to support the restoration by supplying power from other feeders through respective MVDC links.

A typical MV distribution network is illustrated in FIG. 1. The MV distribution network is fed with power from a high voltage (HV) network via one (or more) transformer(s). The transformer(s) are connected to a MV bus bar via breaker(s) illustrated by crosses. Further, MV feeders are also connected to the MV bus bar via breakers, also indicated by crosses. A substation where power is transformed from HV to MV is referred to as a primary substation. Feeder segments below the primary substation comprises cable segments between secondary substations. On each side of the cable segments, switches are available to disconnect cable segments from the secondary substation. These switches can be breakers, load switches or simple disconnectors, illustrated with squares. A filled square illustrates a closed switch and an open, or non-filled, square illustrates an open switch. Further, in the secondary substation, loads are connected, either directly on the MV level, or connected on a low voltage (LV) side of transformers. The breakers in the primary substation and the switches on the feeders are normally closed. There are also open switches, i.e. NO switches, illustrated between the feeders. In this way the MV distribution network can be operated as a radial network, although it is essentially meshed. These NO switches are typically used in case of faults e.g., cable segment faults. Once the faulted cable segment is disconnected, the load below the faulted cable segment can then be served by closing the NO switches. In this way a radial feeder structure can be maintained both in normal operation and in case of faults.

An advantage with the back-to-back MVDC links parallel to the NO switches is that a controllable amount of active power can be transferred between the feeders, while maintaining the radial feeder structure.

As an example, illustrated in FIG. 2, after a fault and isolation of the top section in second feeder from left, the NO switch between first two feeders from left is closed while the other two MVDC links can be used to supply power to reduce the load on the first feeder and to support the restoration of the isolated feeder. The closed NO switch directly connects the first two feeders from the left, and the MVDC links at the two remaining open NO switches can be used to in a controlled way transfer power to the isolated feeder (illustrated with arrows pointing to the left).

With multiple NO switches and MVDC links between the feeders, it is difficult to determine which NO switch to close and which MVDC links to be used to support the restoration. The isolated feeder may have multiple NO's to different feeders as illustrated in FIGS. 1 and 2.

SUMMARY

One objective is to enable restoration of a fault isolated feeder in a MV network having a plurality of feeders.

According to a first aspect there is presented a method for restoration of a fault isolation in a medium voltage (MV) network having a plurality of feeders and a plurality of normally open (NO) switches in parallel with MV direct current (DC) links. The method is performed in a control device of the MV network. The method comprises closing at least two NO switches in parallel with MVDC links of the plurality of NO switches, being connected to a fault isolated feeder of the plurality of feeders of the MV network, and opening the closed at least two NO switches in parallel with MVDC links except one.

By initially closing at least two NO switches in parallel with MVDC links, and thereafter opening the closed NO switches except one of them, multiple synchronous connection can initially be used during a restoration process. Further, a selection to which synchronous connection to keep at a later stage of the restoration process can be determined on an actual situation, whereas an initial decision to select only one suitable synchronous connection directly may involve large simulation efforts and continuous updates.

The method may further comprise selecting which of the closed at least two NO switches in parallel with MVDC links not to open. The selection is based on power flows through the closed at least two NO switches in parallel with MVDC links. The selecting may be based on loss minimization calculation.

The method may further comprise determining power flows between the fault isolated feeder and feeders connected via the closed at least two NO switches in parallel with MVDC links, and opening one of the closed at least two NO switches in parallel with MVDC links when a reverse power flow is determined thereof.

All NO switches in parallel with MVDC links connected to the fault isolated feeder may be closed during the closing.

The closed at least two NO switches in parallel with MVDC links may be opened one at a time except one.

The method may further comprise selecting which of the closed at least two NO switches in parallel with MVDC links to open. The selection is based on power flows through the closed at least two NO switches in parallel with MVDC links.

A MVDC link power set point may be set to a power flow through a parallel NO switch to be opened.

The method may further comprise directing a power flow to the fault isolated feeder by a MVDC link parallel to an open NO switch.

According to a second aspect there is presented a method for restoration of a fault isolation in a MV network having a plurality of feeders and a plurality of NO switches. The method is performed in a control device of the MV network. The method comprises closing at least two NO switches of the plurality of NO switches, being connected to a fault isolated feeder of the plurality of feeders of the MV network, and opening the closed at least two NO switches except one.

According to a third aspect there is presented a control device for restoration of a fault isolation in a MV network having a plurality of feeders and a plurality of NO switches in parallel with MVDC links. The control device comprises a processing circuitry and a computer program product storing instructions that, when executed by the processing circuitry, causes the control device to close at least two NO switches in parallel with MVDC links of a plurality of NO, connected to a fault isolated feeder of a plurality of feeders of a MV network, and to Open the closed at least two NO switches in parallel with MVDC links except one.

According to a fourth aspect there is presented a computer program for restoration of a fault isolation in a MV network having a plurality of feeders and a plurality of NO switches in parallel with MVDC links. The computer program comprises computer program code which, when run in a control device of a MV network, causes the control device to close at least two NO switches in parallel with MVDC links of a plurality of NO, connected to a fault isolated feeder of a plurality of feeders of a MV network, and to open the closed at least two NO switches in parallel with MVDC links except one.

A computer program product comprising a computer program and computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

The use of multiple synchronous connections in restoration of a fault isolation of a medium voltage (MV) network with a plurality of feeders is presented herein. The MV network has a plurality of normally open (NO) switches in parallel with MV direct current (MVDC) links.

Figure 1:
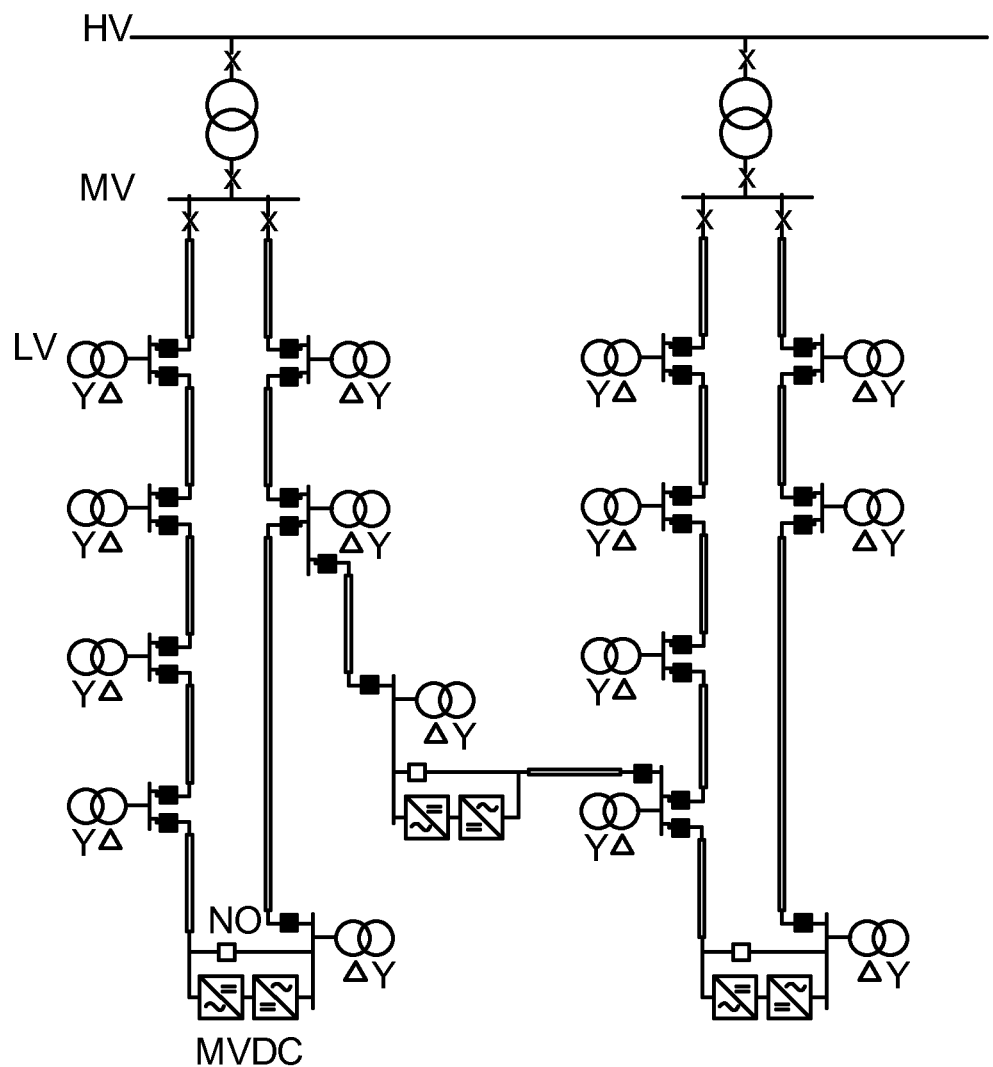
FIG. 1 is a diagram schematically illustrating a medium voltage network with back-to-back MVDC-links installed parallel to normally open switches.
Figure 2:
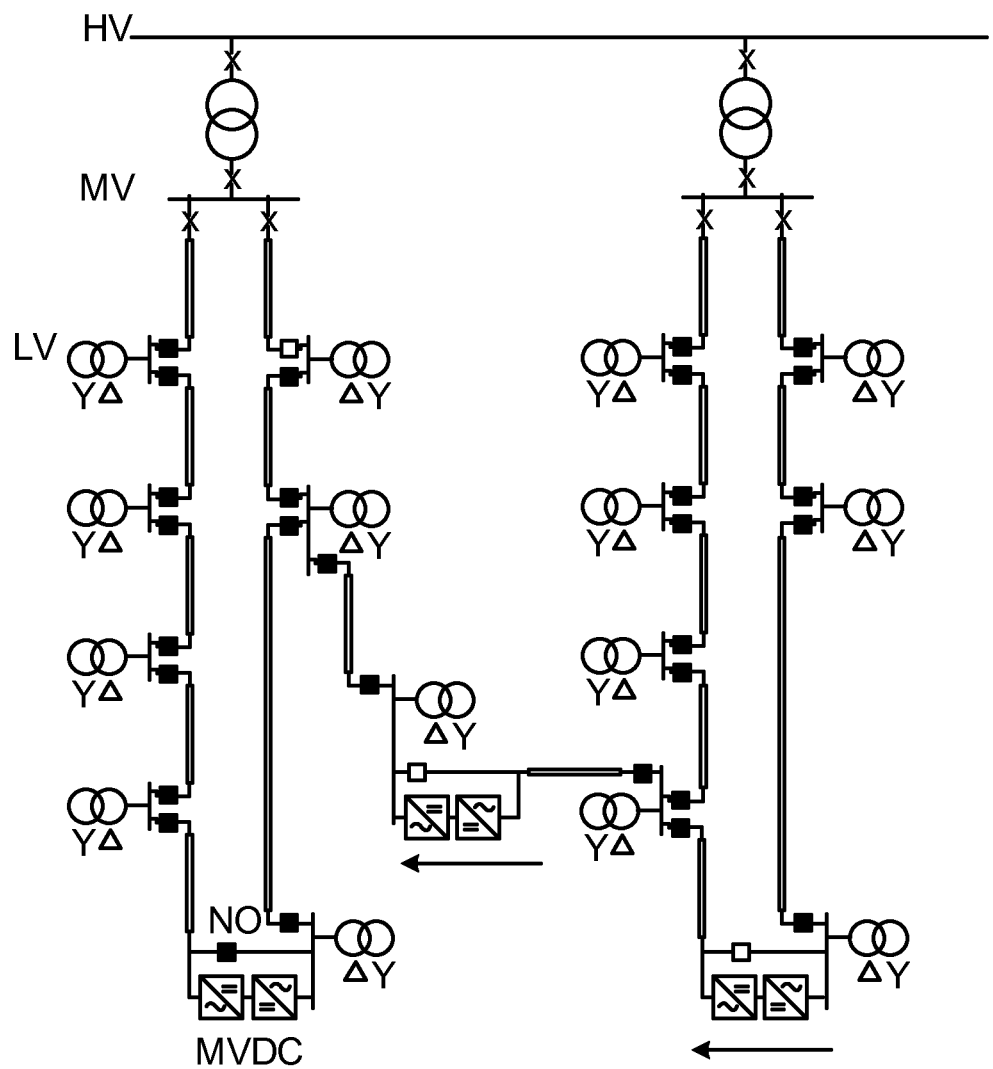
FIG. 2 is a diagram schematically illustrating fault isolation restoration for the medium voltage network shown in FIG. 1.
Figure 3:
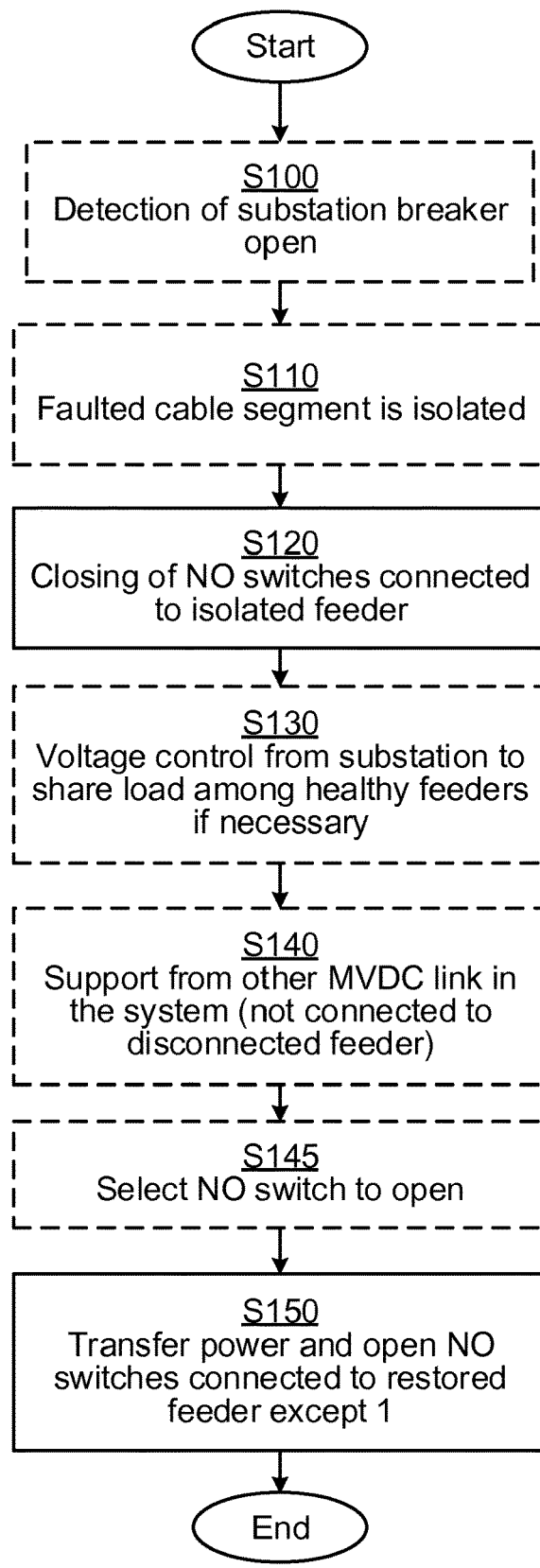
FIG. 3 is a flowchart schematically illustrating embodiments of methods as presented herein.

According to an aspect, an embodiment of a method for restoration of a fault isolation in a MV network having a plurality of feeders and a plurality of NO switches in parallel with MVDC links is presented with reference to FIG. 3. The method is performed in a control device of the MV network. In processing block S120 the control device closes at least two NO switches in parallel with MVDC links of the plurality of NO switches in parallel with MVDC links. The plurality of NO switches in parallel with MVDC links are connected to a fault isolated feeder of the plurality of feeders of the MV network. In processing block S150 the control device opens the closed at least two NO switches in parallel with MVDC links except one.

In optional processing block S100, the initial step of the process, the control device detects an open substation breaker of the MV network.

In optional processing block S110, following optional processing block S100, the control device isolates the faulted cable segment or feeder.

In optional processing block S130, following processing block S120, the control device determines power flows between the fault isolated feeder and feeders connected via the closed at least two NO switches in parallel with MVDC links. The control device opens one of the closed at least two NO switches in parallel with MVDC links when a reverse power flow is determined for the fault isolated feeder. A reverse power flow for a fault isolated feeder is a power flow from the fault isolated feeder. The load of the fault isolated feeder is shared between feeders with closed NO switches in parallel with MVDC links. The sharing may further be voltage controlled by substations between feeders with additional open NO switches in parallel with MVDC links.

In optional block S140, following optional processing block S130, the control device further directs a power flow to the fault isolated feeder by an open NO switch in parallel with a MVDC link. The control device may further support feeders of the at least two closed NO switches in parallel with MVDC links with power from synchronous connections not directly connected to the fault isolated feeder.

In optional processing block S145, following optional processing block S140, the control device selects which of the closed at least two NO switches in parallel with MVDC links not to open. The selection is based on power flows through the closed at least two NO switches in parallel with MVDC links. The selection may alternatively and/or additionally be based on location, voltage, and power set point. The selecting may be based on loss minimization calculation.

In an alternative processing block S145 the control device selects which of the closed at least two NO switches in parallel with MVDC links to open. The selection is based on power flows through the closed at least two NO switches in parallel with MVDC links. The selection may alternatively and/or additionally be based on location, voltage, and power set point. The selecting may be based on loss minimization calculation.

All NO switches in parallel with MVDC links connected to the fault isolated feeder may be closed in processing block S120.

The closed at least two NO switches in parallel with MVDC links may be opened one at a time in processing block S150.

A MVDC link power set point may be set to a power flow through a parallel NO switch to be opened in processing block S150.

Only NO switches in parallel with MVDC links with available power headroom may be closed in processing block S120.

The operations shown in FIG. 3 will now be illustrated and described in more detail in conjunction with FIGS. 4-9.

Figure 4:
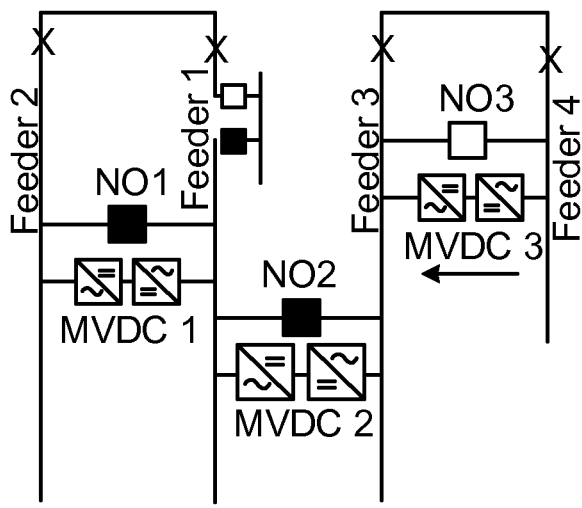
FIG. 4 is a diagram schematically illustrating a simplified representation of an example of fault isolation restoration according to an embodiment presented herein.

FIG. 4 is a diagram schematically illustrating a simplified representation of a MV network with a plurality of feeders Feeder 1-4 and a plurality of NO switches NO1-NO3 in parallel with MVDC links MVDC 1-MVDC 3. The restoration process is done by closing at least two NO switches, here NO1 and NO2, parallel to MVDC links, here MVDC 1 and MVDC 2, connected to the fault isolated feeder, here Feeder 1. Again, breakers are illustrated by crosses and switches are illustrated by squares, wherein a filled square illustrates a closed switch and an open, or non-filled, square illustrates an open switch.

Support from other MVDC links, here MVDC 3, may be used to reduce load in Feeders 2 and 3 through NO links NO1 and NO2.

During restoration all but one of the closed NO switches are opened, e.g. NO switch NO2 is opened and at least NO switch NO1 is kept closed. Power is now transferring through synchronous connection by the corresponding MVDC link MVDC 2. In an alternative restoration process, NO switch NO1 instead opened and NO switch NO2 is kept closed. In the alternative restoration process power is transferring through synchronous connection by the corresponding MVDC link MVDC 1, and may further be supported by power flow through MVDC link MVDC 3.

By closing all, or at least more than one NO switch (connected to the isolated feeder), voltage depression can be reduced compared to closing only one NO switch for the restoration process.

Further, by having more than one connection during the restoration process, the best synchronous connection may be selected during the restoration in a controlled manner, compared to selecting and closing only one NO directly upon detecting an isolated fault.

However, closing at least two NO switches leads to meshed operation of the grid for a short time, contrary to radial protection concepts. Power flow between two healthy networks, e.g. Feeder 2 feeding Feeder 3 in FIG. 4, may occur when more than one NO switch is closed. Although, for a short period of time the power flow between two healthy feeders do not pose high risk with short thermal overload.

A power flow between two healthy feeders may be avoided by not selecting NO switches with large voltage magnitude and angle difference. The difference may e.g., be determined by measurement or by estimate from substation based on feeder current and NO switch location. The difference should at most be within a few degrees.

A reverse power flow can be interrupted by opening the corresponding NO switch if reverse power flow is detected (assuming current measurement is available) at a NO switch feeding power to a healthy feeder (e.g. after NO switch NO2 of FIG. 3 is closed, and a power flow is thereafter detected from feeder Feeder 1 to feeder Feeder 3, NO switch is then opened).

Depending on how two healthy feeders are connected to different buses or substations, and also on the connected load, it may be possible to have a simple voltage control from substation to prevent the reverse power flow (e.g., voltage control at Feeder 3 to shift power flow direction of Feeder 3 to share load in Feeder 1). Off course this may not work well, if both the healthy feeders are connected to the same bus at substations.

Figure 5:
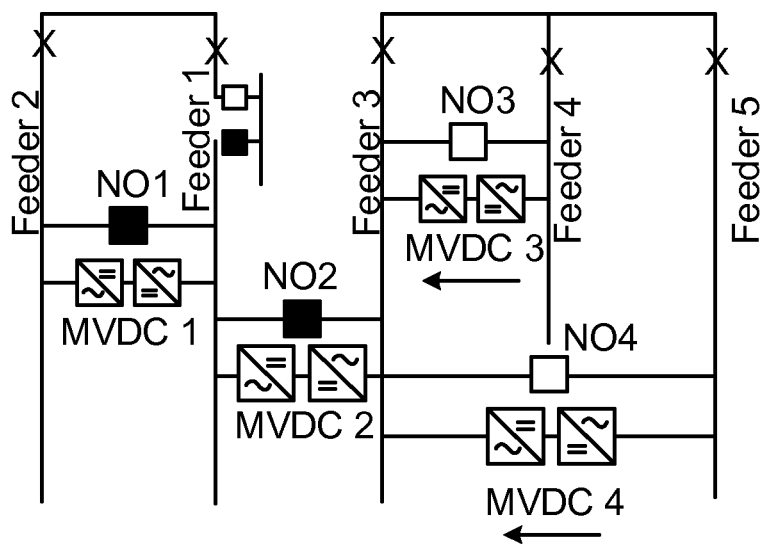
FIG. 5 is a diagram schematically illustrating a simplified representation of another example of fault isolation restoration according to an embodiment presented herein.

FIG. 5 is a diagram schematically illustrating another simplified representation of a MV network with a plurality of feeders Feeder 1-5 and a plurality of NO switches NO1-NO4 in parallel with MVDC links MVDC 1-MVDC 4. This example is similar to the one described in connection with FIG. 4, however with a further feeder, Feeder 5, connected to Feeder 3 in addition to Feeder 4.

Figure 6:
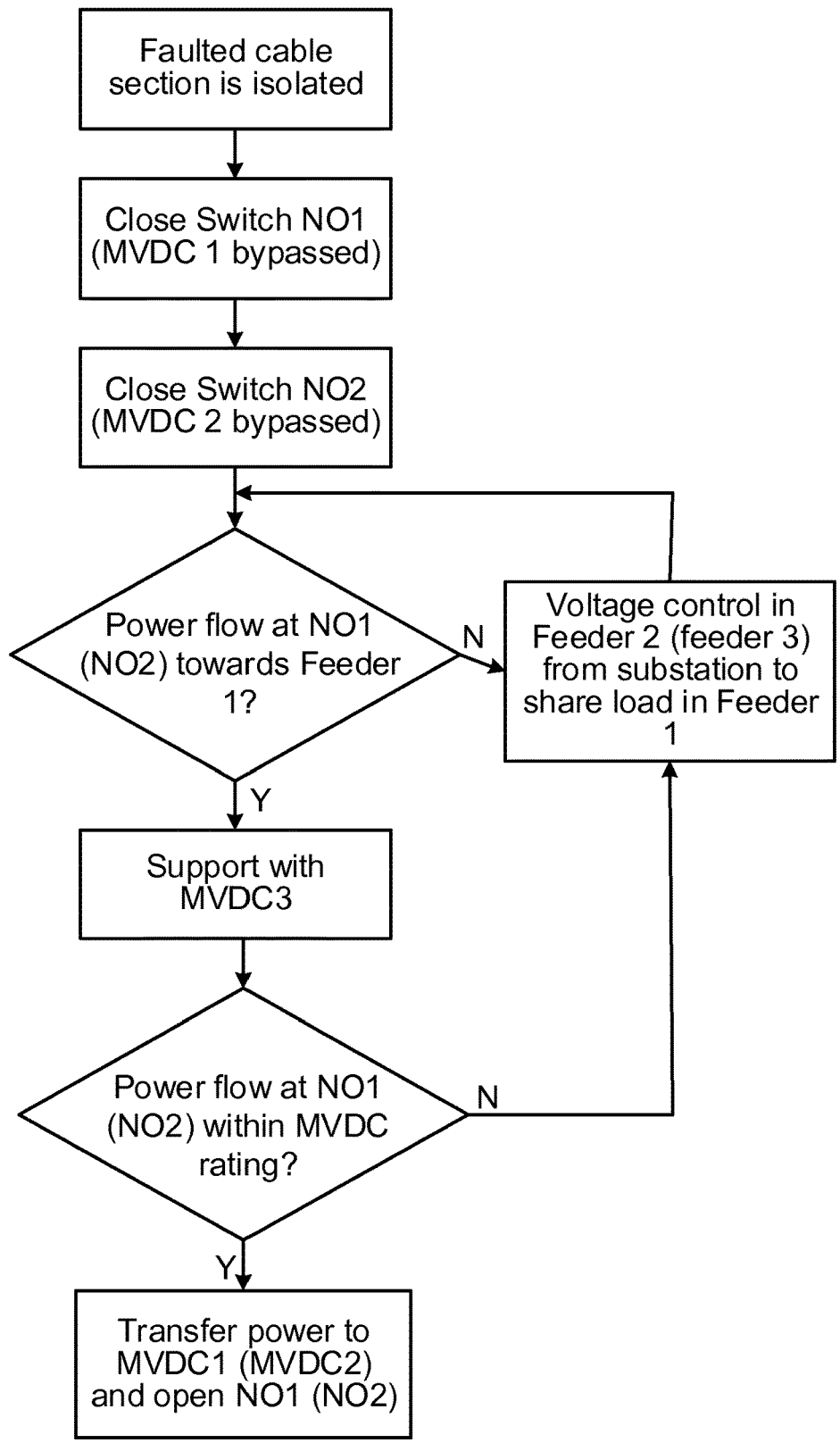
FIG. 6 is a diagram schematically illustrating a switching strategy for the fault isolation restoration shown in FIG. 5.

For the four-feeder example system in FIG. 4, one way of implementing the restoration process may be as described in connection with FIG. 6.

First a faulted cable section is isolated, the fault isolation of Feeder 1.

Next, NO switch NO1 is closed, i.e. MVDC 1 is bypassed. Also, NO switch NO2 is closed, and MVDC2 is bypassed. Both NO switches may be closed simultaneously.

Next, the power flow at NO switch NO1 and NO2, respectively, is checked. If the power flow is not flowing towards the isolated feeder, Feeder 1, voltage control is performed in a substation supplying Feeder 2 and/or Feeder 3, respectively, to share the load of Feeder 1.

When the power flow is flowing to the isolated feeder, Feeder 1, further support to Feeders 1, 2 and 3 may be added by MVDC 3 and/or MVDC 4.

Next it is checked if the power flow at NO switch NO1 and NO2, respectively, is within their respective MVDC power set point. If not, voltage control at respective substations are performed to share the load there between.

When the power flow at NO switches NO1 and NO2, respectively, are within their respective MVDC power set point, power is transferred to one of the NO switches, and the other one is opened.

If we assume that grid operation and switching strategy are decided with a distribution management system (DMS) and substation automations, there is need to coordinate between them and MVDC controllers and NO switches. The coordination may be performed by a control device 1 in the DMS and substation automation, which is described with reference to FIG. 7.

From a grid operation perspective two different types of controllers are assumed. MVDC controllers of links connected to the isolated/disconnected feeder parallel to a NO switch, and MVDC controllers of links connected between healthy feeders parallel to a NO switch.

Figure 7:
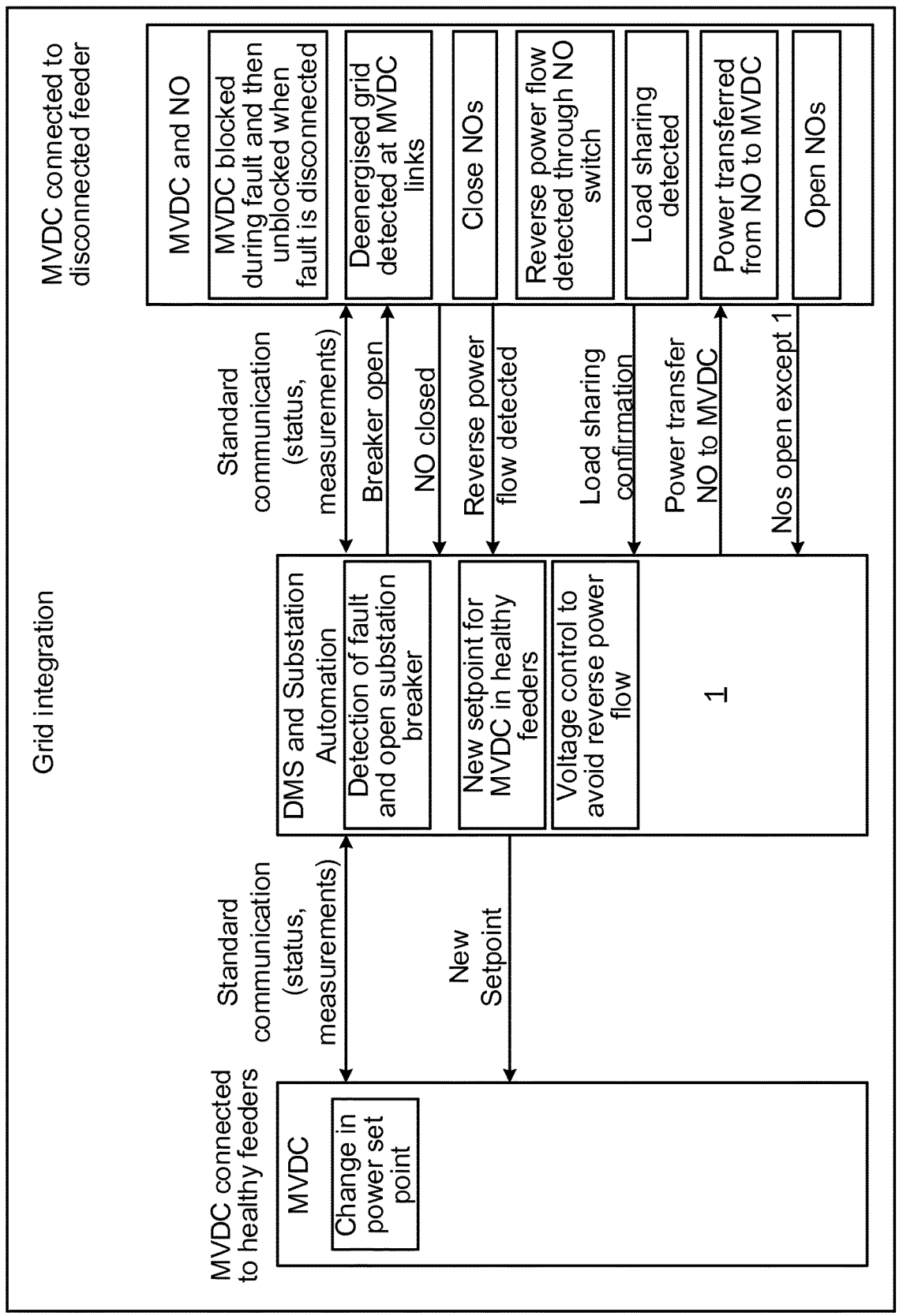
FIG. 7 is a diagram schematically illustrating an example of a grid integration for fault isolation restoration as presented herein.

A simple representation of command, measurement, and function implementation in the MVDC controllers and DMS and substation automation may be implemented shown as in FIG. 7.

The control device may be configured to obtain status and measurements from MVDC controllers by means of standard communications. This may be used to detect a fault and open a substation breaker. As long as a substation breaker is open, the corresponding MVDC is blocked, i.e. until the fault is disconnected or restored.

The control device 1 may be configured to send an open breaker instruction to the MVDC to fault isolate the feeder.

A deenergized grid may be detected at a MVDC or may be indicated from a substation.

NO switches connected to the fault isolated feeder are closed, and if a reversed power flow is detected, new setpoints for power flow for MVDCs in healthy feeders are set by the control device 1 in response thereto. Also, voltage control may be used to avoid reverse power flow, by the control device 1.

Further, when load sharing is detected, load sharing confirmation may be obtained by the control device 1. The control device 1 may then transfer power from all NO switches to all MVDCs, except for one. The corresponding NO switches are thereby opened.

Figure 8:
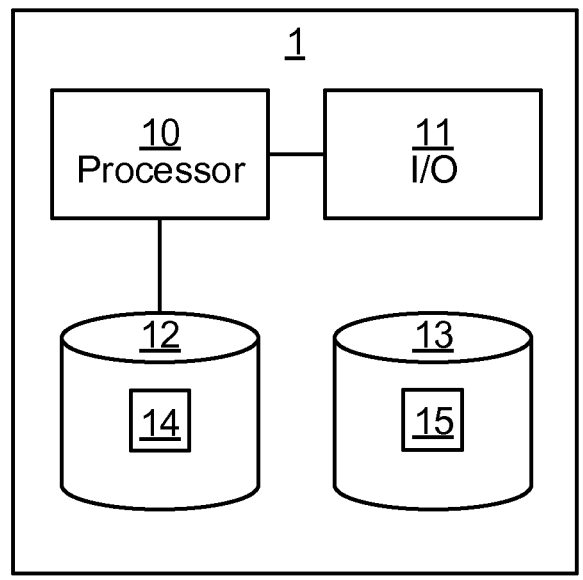
FIG. 8 is a diagram schematically illustrating some components of a control device presented herein.

According to an aspect, an embodiment of control device for restoration of a fault isolation in a MV network is presented with reference to FIG. 8. The MV network has a plurality of feeders and a plurality of NO switches NO1-NO4 in parallel with MVDC links MVDC1-MVDC4. The control device 1 comprises a processing circuitry 10 and a computer program product 12, 13. The computer program product 12, 13 stores instructions 14, 15 that, when executed by the processing circuitry, causes the control device to close at least two NO switches in parallel with MVDC links of a plurality of NO, connected to a fault isolated feeder of a plurality of feeders of a MV network, and to open the closed at least two NO switches in parallel with MVDC links except one.

FIG. 8 is a schematic diagram showing some components of the control device 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 3.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g., hold other software instructions 15, to improve functionality for the control device 1.

The control device 1 may further comprise an input/output (I/O) interface 11 including e.g., a user interface. The control device 1 may further comprise a receiver configured to receive signalling from other nodes, and a transmitter configured to transmit signalling to other nodes (not illustrated). Other components of the control device 1 are omitted in order not to obscure the concepts presented herein.

Figure 9:
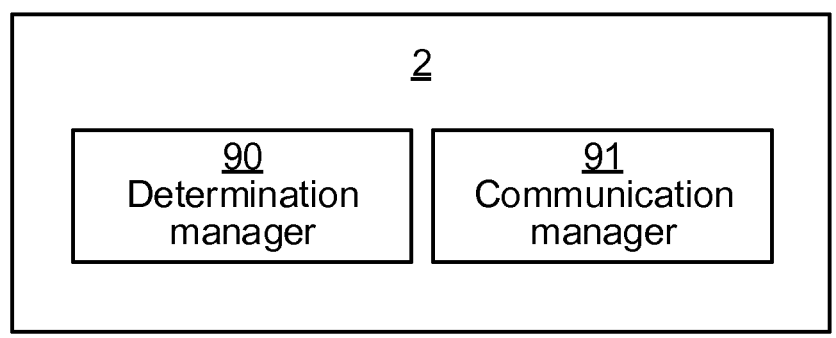
FIG. 9 is a diagram schematically illustrating functional modules of a control device presented herein.

According to an aspect, an embodiment of a control device 1 for restoration of a fault isolation in a MV network having a plurality of feeders and a plurality of NO switches in parallel with MVD links is presented with reference to FIG. 9. The control device 1 comprises a communication manager 91 for closing at least two NO switches in parallel with MVDC links of the plurality of NO switches, being connected to a fault isolated feeder of the plurality of feeders of the MV network, and for opening the closed at least two NO switches in parallel with MVDC links except one. The control device 1 may also comprise a determination manager 90 for handling methods described herein with reference to FIG. 3.

FIG. 9 is a schematic diagram showing functional blocks of the control device 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 3, comprising a communication manager unit 91, and may further comprise a determination manger unit 90. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The modules can e.g., be implemented by the processing circuitry 10 of FIG. 8, when running the computer program.

According to an aspect an embodiment of a computer program for restoration of a fault isolation in a MV network having a plurality of feeders and a plurality of NO switches in parallel with MVDC links is presented with reference to FIG. 8. The computer program comprises computer program code which, when run in a control device of a MV network, causes the control device 1 to close at least two NO switches in parallel with MVDC links of a plurality of NO, connected to a fault isolated feeder of a plurality of feeders of a MV network, and to open the closed at least two NO switches in parallel with MVDC links except one.

A computer program product 12, 13 comprising a computer program 14, 15 and computer readable storage means on which the computer program is stored is also presented.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for restoration of a fault isolation in a medium voltage, MV, network having a plurality of feeders and a plurality of normally open, NO, switches in parallel with MV direct current, DC, links, the method being performed in a control device of the MV network, and the method comprising:

closing at least two NO switches in parallel with MVDC links of the plurality of NO switches, being connected to a fault isolated feeder of the plurality of feeders of the MV network;

selecting which of the closed at least to NO switches in parallel with MVDC links not to open, wherein the selection is based on power flows through the closed at least two NO switches in parallel with MVDC links; and opening the closed at least two NO switches in parallel with MVDC links except one.

2. The method according to claim 1, wherein the selecting is based on loss minimization calculation.

3. The method according to claim 2, further comprising: determining power flows between the fault isolated feeder and feeders connected via the closed at least two NO switches in parallel with MVDC links, and opening one of the closed at least two NO switches in parallel with MVDC links when a reverse power flow is determined thereof.

4. The method according to claim 2, wherein all NO switches in parallel with MVDC links connected to the fault isolated feeder are closed during the closing.

5. The method according to claim 2, wherein the closed at least two NO switches in parallel with MVDC links are opened one at a time except one.

6. The method according to claim 1, further comprising: determining power flows between the fault isolated feeder and feeders connected via the closed at least two NO switches in parallel with MVDC links, and opening one of the closed at least two NO switches in parallel with MVDC links when a reverse power flow is determined thereof.

7. The method according to claim 1, wherein all NO switches in parallel with MVDC links connected to the fault isolated feeder are closed during the closing.

8. The method according to claim 1, wherein the closed at least two NO switches in parallel with MVDC links are opened one at a time except one.

9. The method according to claim 8, comprising: selecting which of the closed at least two NO switches in parallel with MVDC links to open, wherein the selection is based on power flows through the closed at least two NO switches in parallel with MVDC links.

10. The method according to claim 1, wherein a MVDC link power set point is set to a power flow through a parallel NO switch to be opened.

11. The method according to claim 1, further comprising: directing a power flow to the fault isolated feeder by a MVDC link parallel to an open NO switch.

12. A control device for restoration of a fault isolation in a medium voltage, MV, network having a plurality of feeders and a plurality of normally open, NO, switches in parallel with MV direct current, DC, links, the control device comprising:
a processing circuitry; and
a computer program product storing instructions that, when executed by the processing circuitry, causes the control device to:
close at least two NO switches in parallel with MVDC links of a plurality of NO, connected to a fault isolated feeder of a plurality of feeders of a MV network;
select which of the closed at least two NO switches in parallel with MVDC links not to open, wherein the selection is based on power flows through the closed at least two NO switches in parallel with MVDC links; and
open the closed at least two NO switches in parallel with MVDC links except one.

13. A computer program product comprising:
a non-transitory computer readable storage means; and
computer program code stored in the non-transitory computer readable storage means and configured to restore a fault isolation in a medium voltage, MV, network having a plurality of feeders and a plurality of normally open, NO, switches in parallel with MV direct current, DC, links, wherein the computer program code, when run in a control device of the MV network, causes the control device to:
close at least two NO switches in parallel with MVDC links of a plurality of NO, connected to a fault isolated feeder of a plurality of feeders of a MV network;
select which of the closed at least two NO switches in parallel with MVDC links not to open, wherein the selection is based on power flows through the closed at least two NO switches in parallel with MVDC links; and
open the closed at least two NO switches in parallel with MVDC links except one.

* * * * *